April 2, 1957     E. J. HUCKSHOLD     2,787,502
CONE BIT HEAD
Filed Dec. 13, 1954
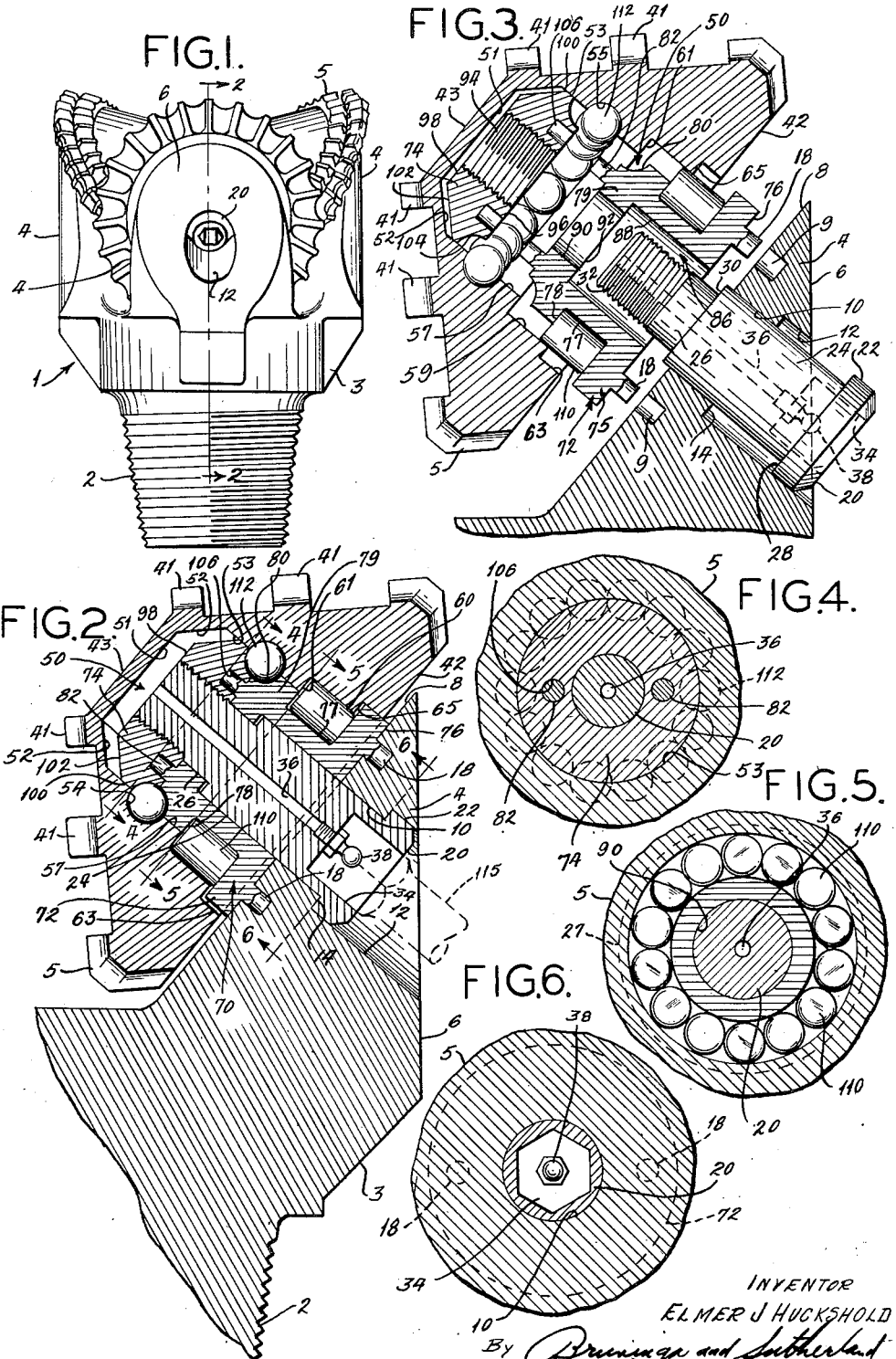

United States Patent Office 2,787,502
Patented Apr. 2, 1957

2,787,502

CONE BIT HEAD

Elmer J. Huckshold, Ferguson, Mo., assignor to Central Mine Equipment Company, St. Louis, Mo., a corporation of Missouri Application December 13, 1954, Serial No. 474,779

5 Claims. (Cl. 308—8.2)

This invention relates to cone-type (roller) rock or earth bits of the type used in mining and quarrying operations and in drilling for water, oil, gas, and the like.

Such bits must withstand extreme abuse. The teeth of such bits are frequently worn down in drilling for even a short time in very hard or abrasive formations. The bearing pins upon which the cones are mounted also are subject to considerable strain and wear as are the anti-friction bearings which are commonly used in such bits.

Heretofore the cones of conical bits have been mounted on bearing pins which are forged integrally with the bit legs and shank of the bit, or welded to the legs.

In order to mount a cone on a bearing pin, a passage has been provided through the wall of the cone, with its inner end positioned immediately above a bearing race on the pin. After the cone has been placed on the bearing pin, ball bearings are introduced through the passage into the race and the passage welded shut. The only way in which the cone can thereafter be removed is to reopen a passage, from which the ball bearings can be removed, or to cut off the cone with a torch.

Under these circumstances, it is practically impossible to replace individual cones in the field. Also neither the anti-friction bearing races and balls and/or rollers, nor the bearing pins can be replaced as they wear out.

Since the bearing pins and races of the bits known heretofore were made integral with the body and legs of the bit, it has been, as a practical matter, impossible to heat treat or otherwise distinguish the bearing pins and races in composition or character from the body of the bits.

Since the cones have not been removable, a different bit has had to be substituted whenever it was desired to change the type of cone to cope with different geological formations.

The cone bits known heretofore have also been so constructed as to preclude any effective lubricating of and purging of foreign matter from the bearings and races.

One of the objects of this invention is to provide a cone-type or roller type bit which is sufficiently rugged to withstand the abuse to which such bits are subjected, and at the same time to provide a bit in which the cones, the bearing pins, anti-friction bearing races, and anti-friction bearings are replaceable in the field.

Another object is to provide such a bit the bearings in which may be pressure lubricated and the races and bearings purged of abrasive material.

Still another object of this invention is to provide such a bit in which the bearing pins and races may be made of steel of different character or may be heat treated differently from the body of the bit.

Other objects will become apparent to those skilled in the art in the light of the following description and accompanying drawing.

In accordance with this invention, generally stated, a bit, of the kind in which a cone having an internal cavity closed at the apex and open at the base of the cone is mounted on a bearing pin which extends through a leg integral with the body of the bit, is provided in which the bearing pin is freely removable from the cone and from the leg upon the release of a retainer within the cone.

In the drawing:

Figure 1 is a view in side elevation of a bit constructed in accordance with an illustrative embodiment of this invention;

Figure 2 is a fragmentary sectional view taken along the line 2—2 of Figure 1;

Figure 3 is a sectional view corresponding to the view shown in Figure 2 showing the cone assembly in partly assembled condition;

Figure 4 is a sectional view taken along the line 4—4 of Figure 2;

Figure 5 is a sectional view taken along the line 5—5 of Figure 2; and

Figure 6 is a sectional view taken along the line 6—6 of Figure 2.

Referring now to the drawing, reference numeral 1 indicates a cone-type bit constructed in accordance with an illustrative embodiment of this invention. The bit 1 is provided with the usual threaded shank 2, and body 3. The body 3 is provided with a plurality of integral legs 4, each adapted to mount a cone 5. The legs 4 have an outer face 6 and an inner face 8. The inner face 8 is substantially plane, and intersects the outer face at an acute angle in a direction away from the shank 2. Each leg 4 is provided with a hole 10, the axis of which is perpendicular to the plane of the inner face 8. The hole 10 extends entirely through the leg 4 and is provided with a counter-bore 12 extending from the outer face 6 to an annular shoulder 14. A bearing pin 20 extends through the hole 10 and projects beyond the inner face 8 of the leg. The bearing pin 20 has a head 22, a shank 24 coaxial with the head 22 but of smaller diameter, and a post 26 coaxial with the shank 24 but of smaller diameter. The juncture of the head 22 and the shank 24 forms an annular shoulder 28. The juncture of the post 26 and the shank 24 forms an annular shoulder 30. The post 26 is provided at its projecting end with a threaded section 32. The end of the head 22 is recessed to produce a polygonal socket 34 which in the embodiment shown extends beyond the head and into the shank 24. A lubricant passage 36 extends from the bottom of the socket 34 through the outer end of the post 26 and is closed at the bottom of the socket by a grease fitting 38.

In assembled position, as shown in Figure 2, the shoulder 28 of the bearing pin 20 seats against the shoulder 14 in the leg 4.

A cone 5 is mounted on each bearing pin 20. The cones 5 may have any desired external configuration. As shown in the drawing, the cones 5 are provided with the usual teeth 41. Each cone has a wide base 42 and an apex 43 which in certain of the cones will be truncated as shown in Figures 2 and 3. Each of the cones has the same internal structure. As shown in Figures 2 and 3, each cone 5 is hollow. The cone itself is circular in cross-section at right angles to the axis of the bearing pin 20, and a cavity 50 in the cone 5 is also circular along the same section, as indicated in Figure 5. The cavity 50 is stepped, being largest in diameter at the base 42, and smallest at its closed bottom 51 near the apex 43. In the embodiment shown, the wall defining the cavity 50 has an outwardly flaring portion 52 extending a short distance from the bottom 51. The wall then extends axially at 53 to a semi-circular groove 55 which forms one-half of a race 54. Continuing toward the base 42, the ball bearing cavity 50 extends axially at 57 until it meets a roller bearing race section 59 which forms a part of a roller bearing race 60. The cone roller bearing race section 59 is of greater diameter than the section 57 and the two sections define at their juncture a cone shoulder 61. The cone roller bearing race 59 extends toward the base 42 until it meets a base recess 63 of greater diameter, the juncture of the two serving to define a base recess shoulder 65.

Mounted on the bearing pin 20 and within the cone 5 is a bearing assembly 70 which serves rotatably to support the cone and to mount the cone on the bearing pin.

The bearing assembly 70 is made up of a sleeve 72 and a nut 74.

The sleeve 72 has a base flange 75 with a flat lower surface 76 which rests flat on the face 8 of the leg 4 when the cone is assembled. Guide pins 18 extending from the surface 76 take into sockets 9 opening into the face 8 of the leg 4. Above the base (in a direction toward the apex of the cone), the sleeve 72 is provided with a roller bearing channel 77, defined by the flange 75 and an annular roller bearing shoulder 78. At its end 79 opposite the base 76, the outside edge of the sleeve is cut away in an arc to form a sleeve quadrant 80 of the ball bearing race 54. Upper guide pins 82 extend from the end 79 of the sleeve 72. The sleeve 72 has a bore 86 profiled complementarily to the shank 24 and post 26 of the bearing pin 20, with a shank section 88, a post section 90 and a shoulder 92. The bore 86 is so dimensioned as to permit the bearing pin 20 to slide in it and to be turned without binding.

The nut 74 is provided with internal threads 94 complementary to the threads 32 on the post 26. The threaded section 94 extends between a flat base 96 and an upper face 98 of the nut. A side wall 100 of the nut fits slidably within the axial section 53 of the cavity 50. A beveled section 102 between the upper face 98 and the side wall 100 corresponds with the outwardly flaring section of the cavity 50 between the bottom 51 and the section 53. The nut 74, between the base 96 and the side wall 100, is cut away in a quadrant arc 104 which forms the nut quadrant of the ball bearing race 54. The base 96 of nut 74 is provided with nut sockets 106 into which upper guide pins 82 on the sleeve 72 take, as shown in Figure 2.

Roller bearings 110 occupy the roller bearing race 60. Ball bearings 112 occupy the ball bearing race 54.

In constructing the bit of this invention, the entire bit body, shank, and legs may be fabricated in one piece if desired. The holes 10 may be produced in any suitable way as by boring and counter-boring. The sockets 9 may be bored in the faces 8.

In installing a bearing assembly 70 in a cone 5, the cone is turned with its apex down and the nut 74 is placed in the bottom of the cavity 50, with the beveled section 102 of the nut engaging the flared portion 52 of cavity 50, in which position the nut does not obstruct groove 55. The ball bearings 112 are then placed into the groove 55 where they are held by a coating of grease or the like or a suitable guide tool. The nut 74 can then be pulled up into race-forming position and the cone inverted so that the base 42 is down, in which position the ball bearings 112 will be held positively in place.

The roller bearings 110 are put into place in the channel 77. The sleeve 72 with the roller bearings 110 in place, is then slipped into the cavity 50 with the guide pins 82 aligned to take into the sockets 106, and seated within the cone, when the race quadrant 80 is in position to complete the race 54.

The cone with the bearing assembly installed is then set into place on the leg 4, with the guide pins 18 seating in the sockets 9. The bearing pin 20 is then inserted threaded end first through the hole 10 from the side 6 and the threaded section 32 of the post 26 is screwed into the threaded section 94 of the nut 74. The bearing pin is tightened by means of a tool 115 having a polygonal head to fit the socket 34 and a cup in its end to accommodate the fitting 38.

It can be seen that the details of installation of the bearing assembly can be varied, the particular method recited being only illustrative.

The bearing assembly can be lubricated with a grease gun by attaching the gun to the fitting 38 and pumping lubricant through the passage 36 and into the space between the nut 74 and the bottom 51 of the cavity 50, thence back through the ball bearing race 54 and the roller bearing race 60. Since there is sufficient clearance between the interior surface of the cone and the stationary nut 74 and sleeve 72, and between base 42 of the cone and face 8 of the leg to permit free rotation of the cone, the lubricant can be pumped back out of the assembly to escape between the cone base and the face 8 of the leg. By pumping lubricant through the path described, the races and bearings can be purged of abrasive material which might find its way into those parts. Since lubricant is forced into a chamber immediately above the threaded end of nut 74, the threaded parts 32 and 94 are also lubricated to some extent and the pin 20 may readily be removed with the tool 115.

It can be seen that the bearing pin 20, the nut 74, and the sleeve 72 may be made of steel of different composition from the body 3 of the bit or the cone 5 or even from one another. They may easily be separately heat treated, and they are readily replaceable.

Ball bearings may be substituted for the roller bearings 110 as, for example, by making a semi-circular groove in the sleeve 72 in place of the channel 77, shaping the shoulder 61 and the part of the race 59 contiguous with it in the form of a quadrant arc, and providing a ring insert having a quadrant arc face (positioned between the flange 75 and the shoulder 61) to complete the ball bearing race.

The guide pins 18 and 82 are necessary to prevent the nut 74 and sleeve 72 from turning as the bearing pin 20 is tightened, since the nut 74 and the sleeve 72 must have sufficient clearance with respect to the walls of the cavity 50 to permit the cone 5 freely to rotate. The roller bearings 110 are required to take only the radial thrust on the cone 5, while the ball bearings 112 take the axial thrust.

Thus it can be seen that a cone bit head is provided in which the cones are individually removable and replaceable without requiring that all cones be removed at once, and in which the bearing pin and anti-friction bearing races can readily be replaced and easily be heat treated or otherwise distinguished in composition or character from the remaining elements of the bit head, and the bearing parts of which can be lubricated and purged of abrasive materials.

Numerous variations in the construction of the bit, within the scope of the appended claims will occur to those skilled in the art in the light of the foregoing disclosure.

Having thus described the invention, what is claimed and desired to be secured by Letters Patent is:

1. In a conical bit wherein cones are mounted for rotation on bit legs with the apexes of the cones directed inwardly with respect to one another and their bases adjacent the bit legs, the improvement comprising a bit leg having a hole through it; a bearing pin removably mounted in said hole and rotatable for assembly and disassembly of a cone mounted thereon, said bearing pin having an end projecting inwardly from said bit leg, said end having a threaded section; a one-piece cup-shaped cone removably and freely rotatably mounted on said bearing pin, said cone having a cavity open at the base of said cone and closed at the apex of said cone and provided with an internal annular groove; and a bearing assembly by which the cone is mounted on the bearing pin, said bearing assembly including a nut threaded on the threaded section of the projecting end of the bearing pin, said nut having a base and a side wall and an annular groove around the edge of the nut between the base and the side wall, said annular groove forming, with the internal annular groove on said cone, a part of an antifriction bearing race, a sleeve mounted on the bearing pin and removable therefrom for assembly and disassembly of said bearing assembly, said sleeve abutting the nut and having an annular groove around its nut-abutting edge complementary to the annular groove around said nut and serving to complete the antifriction bearing race; antifriction bearings in said race, said antifriction bearings serving as means for retaining the cone on the bearing pin; and means for locking the nut and sleeve against rotation with respect to one another and with respect to the leg.

2. In a conical bit wherein cones are mounted for rotation on bit legs with the apexes of the cones directed inwardly with respect to one another and their bases adjacent the bit legs, the improvement comprising a bit leg having a hole through it; a bearing pin removably mounted in the hole and rotatable for assembly and disassembly of a cone mounted thereon, said bearing pin having an end projecting inwardly from said bit leg, said end having a threaded section; a one-piece cup-shaped cone removably and freely rotatably mounted on said bearing pin; and a bearing assembly by means of which the cone is mounted on said bearing pin, said bearing assembly including an internally threaded nut threaded onto the threaded section of the projecting end of the bearing pin, a sleeve mounted on the bearing pin between the leg and the nut, said sleeve being removable from said bearing pin for assembly and disassembly of the bearing assembly, said nut and said sleeve being shaped to define elements of antifriction bearing races, said cup-shaped cone having a cavity open at the base of said cone and closed at the apex of said cone, said cone carrying, on its inside wall, elements of said antifriction bearing races complementary to the elements defined by the nut and sleeve; antifriction bearings in said races, said antifriction bearings serving to retain said cone on said bearing assembly; and means for locking the nut and sleeve against rotation with respect to one another and with respect to the leg.

3. The bit of claim 2 wherein the inner wall of the cup-shaped cone is provided with a semi-circular annular groove, the nut and sleeve abut, and the abutting edges of the nut and sleeve are each provided with a quadrant annular groove, the cone groove and nut and sleeve grooves forming, when the parts are assembled, a ball bearing race.

4. The bit of claim 3 wherein the sleeve is provided with an annular channel defined in the direction toward the leg by a flange and in the other direction by a shoulder, the inner wall of the cone is provided with an annular recess defined only by an axial side wall and a shoulder substantially aligned with the channel-defining shoulder of the sleeve, said recess and channel forming, when the parts are assembled, a roller bearing race between the ball bearing race and the leg.

5. In a bit of the kind described wherein a cone having an internal cavity closed at the apex and open at the base of the cone is mounted upon a bearing pin which extends through a leg integral with the body of the bit and into the cone, the improvement which comprises, said pin having a screw-threaded part disposed within said cone cavity, a circumferential series of rotatable bearings between said pin and said cone, a nut within said cone cavity, said nut being fixed against rotation when the bit is in assembled condition, but being movable relative thereto axially for assembly and disassembly of said cone, said nut having a portion arranged for disposition in axial thrust-transmitting relationship with said bearings, said cavity having a groove arranged for disposition in axial thrust-transmitting relationship with said bearings, the innermost radial extremity of said groove being outward of the outermost radial extremity of said nut, said bearing pin being rotatable relative to said leg to move said nut into and retain the same in thrust-transmitting relationship with said bearings, said bearing pin having a manipulable part exposed on the exterior of said leg, and means anchored to said leg for positively preventing rotation of said nut relative to said leg.

References Cited in the file of this patent

UNITED STATES PATENTS

| | | |
|---|---|---|
| 1,729,062 | Bull | Sept. 24, 1929 |
| 2,100,640 | Efromson | Nov. 30, 1937 |
| 2,176,358 | Pearce | Oct. 17, 1939 |
| 2,210,077 | Hanly | Aug. 6, 1940 |
| 2,654,577 | Green | Oct. 6, 1953 |